UNITED STATES PATENT OFFICE.

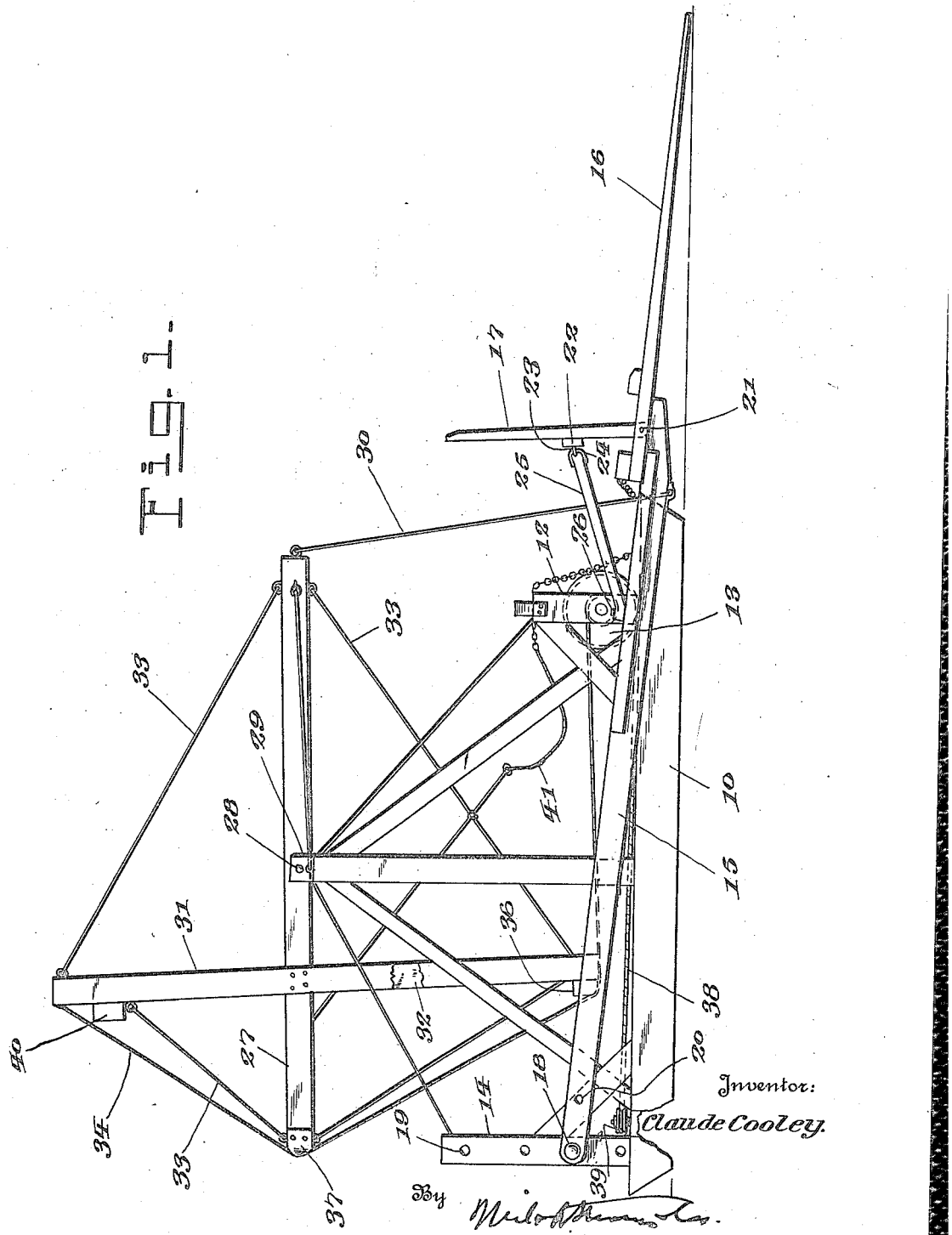

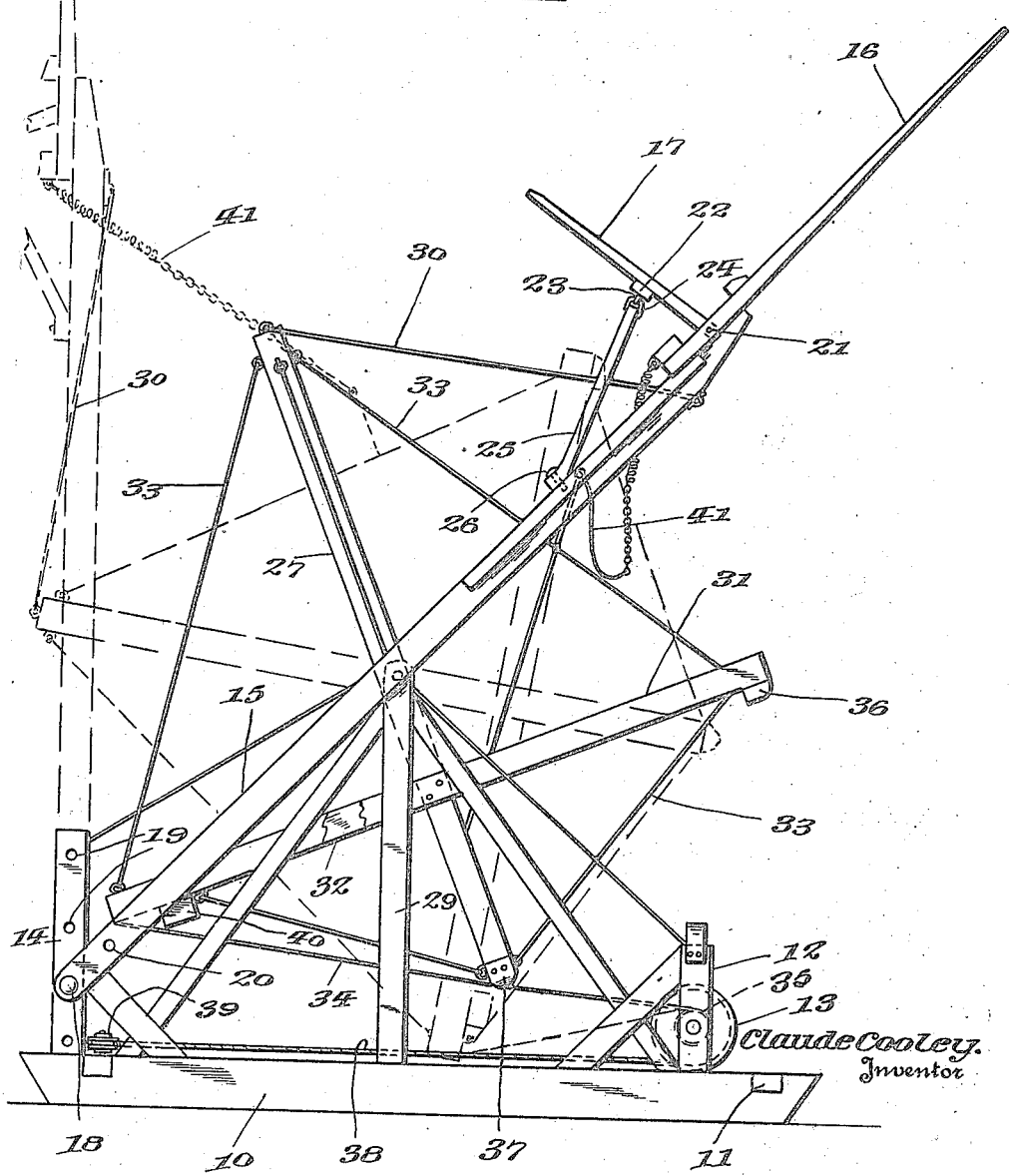

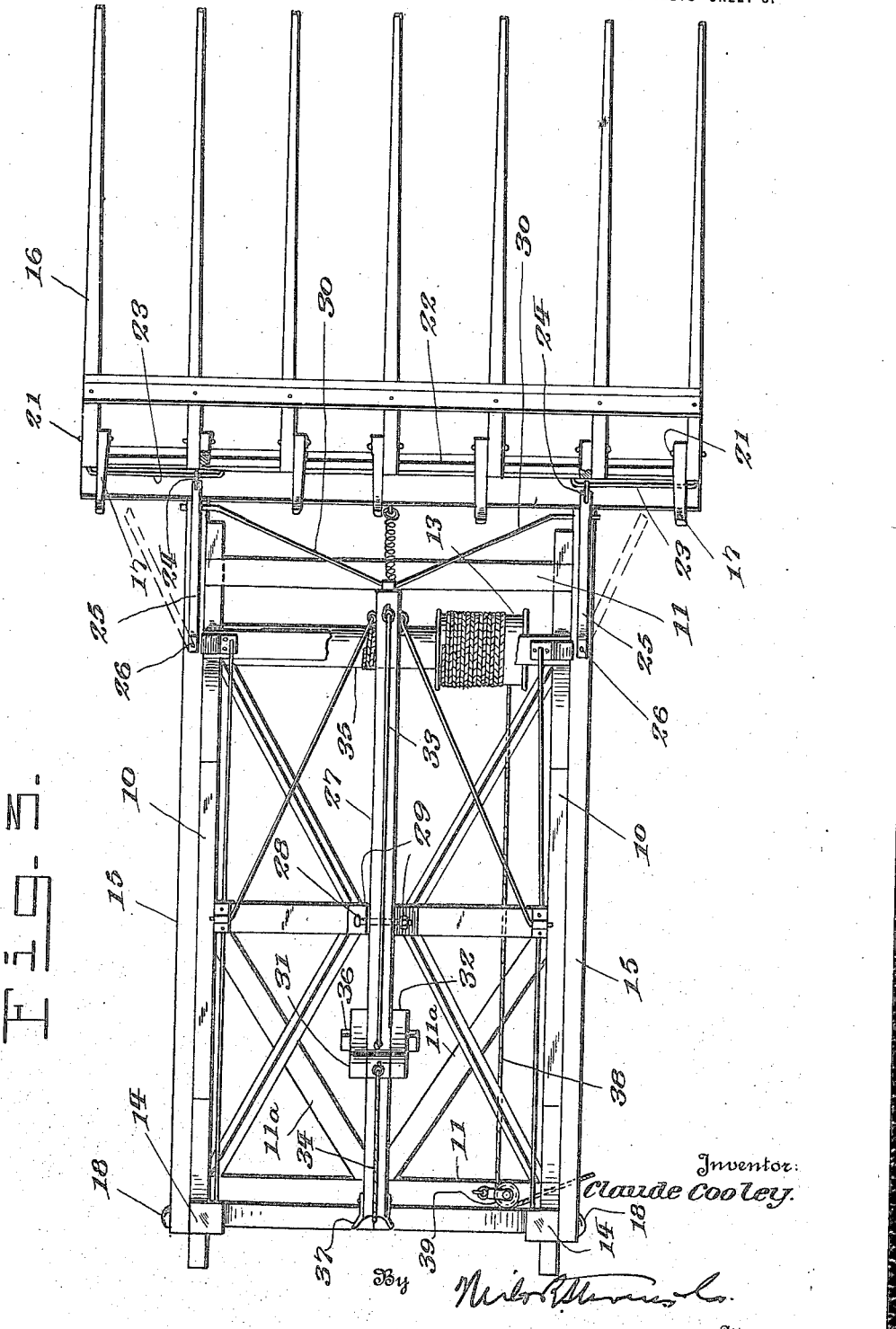

CLAUDE COOLEY, OF LUCERNE, MISSOURI.

HAYSTACKER.

1,424,158. Specification of Letters Patent. Patented Aug. 1, 1922.

Application filed March 10, 1921. Serial No. 451,270.

*To all whom it may concern:*

Be it known that I, CLAUDE COOLEY, a citizen of the United States, residing at Lucerne, in the county of Putnam and State of Missouri, have invented new and useful Improvements in Haystackers, of which the following is a specification.

This invention relates to apparatus for stacking hay, and its main object is to provide a stacker which is very easy to operate.

The invention also has for its object to provide a stacker having a load-supporting fork which is adjustable vertically to pile hay in stacks varying in height.

A further object of the invention is to provide the load-supporting fork which is adjustable by a very simple and efficient means to properly dump the load as the height of the stack increases.

With the objects stated in view, the invention consists in a novel combination and arrangement of parts to be hereinafter described and claimed, and in order that the same may be better understood, reference is had to the accompanying drawings forming part of this specification.

In the drawing,

Figure 1 is a side elevation of the apparatus with the fork in lowered position;

Fig. 2 is a similar view showing the fork partly elevated, the dumping position being shown in dotted lines, and Fig. 3 is a plan view of the apparatus.

Referring specifically to the drawings, the supporting frame of the stacker comprises a pair of sills 10 rigidly connected in laterally spaced and parallel relation by cross bars 11 and braces 11ª. The forward ends of the sills carry braced upright posts 12 which support a winding drum 13, and at their rear ends, the sills carry braced standards 14 to which the elevating arms 15 of the load-supporting member are pivoted, said member being a fork having the usual main longitudinal teeth 16 and the rear or pitcher teeth 17.

The fork arms 15 are pivoted to the standards 14 by bolts 18, and the standards are provided with several vertically spaced bolt holes 19 so that the pivotal connections of the fork arms may be adjusted vertically. The upward sweep of the load-supporting fork may therefore be increased to pile hay in stacks varying in height. The arms 15 also have two longitudinally spaced bolt holes 20 to further vary the range of operation of the apparatus as to height.

The pitcher teeth 17 are pivoted to the longitudinal teeth 16 as shown at 21, so that they may be set at different angles with respect to the latter. A cross bar 22 connects the entire series of pitcher teeth so that they may be swung as one. In order to hold the pitcher teeth at the desired angle, the cross bar 22 carries rods 23 near its ends extending lengthwise thereof and slidably engageable by eyes 24 on the outer ends of brace bars 25 pivoted at their rear ends, as shown at 26, to the arms 15. When the bars 25 are swung to extend straight forward between the arms 15 and the cross bar 22, the teeth 17 are in their ordinary erect position, and if it is desired that said teeth have a greater rearward slant, it is necessary only to swing the bars 25 laterally and outwardly as shown dotted in Fig. 3 so that they now extend obliquely in a lateral direction between the arms 15 and the bar 22, which, tilts the teeth 17 back, the amount of tilt depending on the extent to which the bars 25 are swung laterally. The teeth 17 can thus be easily set at any desired angle to properly pitch the load of hay as the height of the stack increases. The rearward pressure of the bar 22 by the load against the same and the teeth 17, binds the eyes 24 on the rods 23 to such a degree that the bars 25 cannot accidentally slip in a direction to let the teeth 17 tilt back, and they are thus securely locked in adjusted position.

The following means are provided for elevating and lowering the load-supporting fork:

The sills 10 support a frame work rising to a suitable height and carrying a vertically swinging lever 27, the same being pivoted intermediate its ends, as shown at 28, to uprights 29 forming a part of the frame work. The forward end of the lever 27 is connected by rods 30 to the forward ends of the fork-arms 15. It will therefore be seen that the fork swings upwardly when the rear end of the lever 27 is swung downwardly. The parts are so arranged that the lever is horizontal, or nearly so when the fork is down.

The rear arm of the lever 27 carries pairs of arms 31 and 32 extending transversely thereof and projecting from opposite sides thereof. These arms may each be made in one piece, and they project respectively above and below the lever when it is in horizontal position. Brace rods 33 extend between the outer ends of the arm and the lever.

To the upper arm 31 is fastened a hauling line 34 which extends downwardly across the rear end of the lever 27, and then downwardly and forwardly across the outer end of the bottom arm 32, from which latter it extends forwardly to a reduced portion 35 of the drum 13 to which it is made fast so that it may be wound thereon. Where the line 34 crosses the arm 32 the latter has a cross bar 36 against which the line is adapted to bear, and on the rear end of the lever 27 are guard plates 37 to prevent the line from slipping off the same.

On the drum 13 is made fast and wound an operating line 38, which latter, when it is unwound turns the drum in a direction to wind the line 34 on the reduced portion 35, and when the line 34 is thus hauled in, the lever 27 is swung in a direction to elevate the fork. The line 38 passes over a guide pulley 39 so that it may be led sidewise from the apparatus for attachment of a team.

It will be noted that when the line 34 starts to haul in it pulls on the outer end of the arm 32, and as this point is a considerable distance from the fulcrum 28 of the lever 27, a powerful leverage is obtained to start the upward swing of the fork. As the fork swings upwardly, the arm 32 travels forwardly until it is clear of the line 34, but the rear end of the lever has now swung downwardly far enough to receive the pull of the line so that the upward swing of the fork continues. The rear end of the lever also eventually swings forwardly clear of the line 34, and when this occurs, the outer end of the arm 31 is pointing downwardly and the line now starts to pull on this arm to continue the swing of the lever until the fork reaches its dumping position, as shown dotted in Fig. 2.

To lower the fork, the line 38 is released, whereupon the line 34 unwinds and allows the lever 27 to swing in a direction to lower the fork. The descent of the fork is easy as it is checked by a counterweight 40 carried by the outer end of the arm 31.

In order to prevent the fork from going over too far when it is elevated to dumping position, the usual check line 41 is provided, the same being connected to one of the brace rods 33. This excessive movement of the fork is also prevented by the connection 30 between the same and the lever 27. When the fork has reached its dumping position, the end of the lever to which the fork is connected points rearwardly and the connection 30 extends upwardly, and hence the fork now cannot swing downwardly in a rearward direction.

By means of the lever mechanism and its actuating means hereinbefore described, the fork is easy to operate, very little power being required for this purpose. The wheel-and-axle principle employed in connection with the lines 34 and 38 is also an obvious mechanical advantage.

I claim:

1. A hay-stacker comprising a supporting frame, a vertically swinging load-supporting fork carried by the frame, a lever carried by the frame and pivoted intermediate its ends, a connection between the fork and one arm of the lever, lever-operating arms extending laterally from the other arm of the lever, and an operating line connected to one of the lever-operating arms, and passing across the outer end of the second-mentioned lever arm and also across the outer end of the other lever-operating arm.

2. A hay-stacker comprising a supporting frame, a vertically swinging load-supporting fork carried by the frame, a lever carried by the frame and pivoted intermediate its ends, a connection between the fork and one arm of the lever, lever-operating arms extending laterally from the other arm of the lever, an operating line connected to one of the lever-operating arms, and passing across the outer end of the second-mentioned lever arm and also across the outer end of the other lever-operating arm, a drum on which the line is wound, and means for operating the drum.

3. A hay-stacker comprising a supporting frame, a vertically swinging load-supporting fork carried by the frame, a lever carried by the frame and pivoted intermediate its ends, a connection between the fork and one arm of the lever, lever-operating arms extending laterally from the other arm of the lever, an operating line connected to one of the lever-operating arms, and passing across the outer end of the second-mentioned lever arm and also across the outer end of the other lever-operating arm, a drum having sections of different diameters, and a drum-operating line connected to one of the drum sections, the first-mentioned line being connected to the other drum section.

4. A hay-stacker comprising a supporting frame, a vertically swinging load-supporting fork carried by the frame, a lever carried by the frame and pivoted intermediate its ends, a connection between the fork and one arm of the lever, a hauling line for operating the lever, and means on the lever and engageable by the hauling line for applying the pull of said line thereto at different points remote from its fulcrum.

5. A hay-stacker comprising a supporting frame, a vertically swinging load-supporting fork carried by the frame, a lever carried by the frame and pivoted intermediate its ends, a connection between the fork and one arm of the lever, a hauling line for operating the lever, and means on the lever and engageable by the hauling line for applying the pull of said line thereto at angularly spaced points remote from its fulcrum.

6. A hay-stacker comprising a supporting frame, a vertically swinging load-supporting fork carried by the frame, a lever carried by the frame and pivoted intermediate its ends, a connection between the fork and one arm of the lever, a hauling line for operating the lever, and means on the lever for successively applying the pull of said line thereto at different points remote from its fulcrum.

7. A hay-stacker comprising a supporting frame, a vertically swinging load-supporting fork carried by the frame, a lever carried by the frame and pivoted intermediate its ends, a connection between the fork and one arm of the lever, a hauling line for operating the lever, and means on the lever for successively applying the pull of said line thereto at angularly spaced points remote from its fulcrum.

In testimony whereof I affix my signature.

CLAUDE COOLEY.